United States Patent [19]

Ueno et al.

[11] Patent Number: 4,790,466

[45] Date of Patent: Dec. 13, 1988

[54] PIN TRACTOR

[75] Inventors: Toshihiko Ueno; Hiroshi Daini, both of Kobe, Japan

[73] Assignee: Bando Chemical Industries, Ltd., Hyogo, Japan

[21] Appl. No.: 71,498

[22] Filed: Jul. 9, 1987

[30] Foreign Application Priority Data

| | | | |
|---|---|---|---|
| Jul. 9, 1986 | [JP] | Japan | 61-162550 |
| Jul. 9, 1986 | [JP] | Japan | 61-162551 |
| Jul. 9, 1986 | [JP] | Japan | 61-162552 |
| Aug. 14, 1986 | [JP] | Japan | 61-191493 |

[51] Int. Cl.[4] .......... G03B 1/30

[52] U.S. Cl. .......... 226/74; 400/616.1

[58] Field of Search .......... 220/337, 338; 226/74, 226/75, 170; 403/290, 350, 354; 400/616, 616.1, 616.2

[56] References Cited

U.S. PATENT DOCUMENTS

| | | | |
|---|---|---|---|
| 3,938,721 | 2/1976 | Staneck et al. | 226/75 |
| 4,129,239 | 12/1978 | Hubbard | 226/75 |
| 4,199,091 | 4/1980 | Hubbard | 226/74 |
| 4,216,862 | 8/1980 | Daenen | 220/337 X |
| 4,457,463 | 7/1984 | Hubbard et al. | 226/74 |
| 4,569,468 | 2/1986 | Neer | 400/616.1 X |
| 4,614,287 | 9/1986 | Ueno et al. | 226/74 |

FOREIGN PATENT DOCUMENTS

| | | | |
|---|---|---|---|
| 964294 | 3/1975 | Canada | 226/74 |
| 2471865 | 6/1981 | France . | |

*Primary Examiner*—David Werner
*Attorney, Agent, or Firm*—Armstrong, Nikaido, Marmelstein & Kubovcik

[57] ABSTRACT

A pin tractor for feeding blank paper for use in various printers, typewriters, etc. which are used as output devices for electronic computers, especially for personal computers. A belt carrying pins is driven to turn by a toothed driving pulley provided at a frame comprising only one member. The toothed driving pulley is supported to the frame only at one end portion thereof and the other end portion is a flange exposed outwardly. A positioning mark is provided at the exposed surface of the other end portion of the pulley.

18 Claims, 5 Drawing Sheets

PIN TRACTOR

BACKGROUND OF THE INVENTION

1. Field of the Invention

This invention relates to a pin tractor for feeding blank paper for use in various printers, typewriters, etc. which are used as output devices for electronic computers, especially for personal computers.

2. Description of the Prior Art

In various printers, typewriters, etc. which are used as output devices for electronic computers, etc., pin tractors are generally used which feed blank paper by engaging pins of an endless belt carrying pins with feed perforations at both edges of blank paper and by running the endless belt carrying pins. Such pin tractors, are disclosed by U.S. Pat. No. 4,130,230 and Japanese Utility Model Registration Application Laying Open Publication No. 60-191450, for example, are so designed that an endless belt carrying pins engages with and is driven by a toothed pulley which is run by a driving shaft and is rotatably supported between two members forming a frame.

Since pin tractors feed blank paper at a fixed speed by engaging pins of a belt with feed perforations at each edge of the blank paper, it is necessary that the right and left belts carrying pins which engage with each edge of the blank paper turn synchronously. Therefore, if the pin tractor is of such construction that a toothed driving pulley is arranged between two members forming a frame, it is difficult to properly synchronize pins of the right and left belts carrying pins, when fitting a pin tractor to a driving shaft.

In the conventional pin tractors mentioned above, for the purpose of reducing the turning torque of a toothed driving pulley for driving the belt carrying pins is mounted rather loosely and is caused to run straight in an open guide groove made in a frame. More particularly, the guide groove has guide surfaces close to both edges of the belt carrying pins, which runs with its blank paper feeding surface (surface of the belt base) almost on the same level with the surface of the frame. Therefore, when the blank paper is being fed, a blank paper feeding load is generated due to sliding resistance between the blank paper and the surface of the frame, with a reduction in the blank paper feeding efficiency, especially in the case where blank paper quality is rough. Also, if the belt carrying pins is loose, when blank paper is fed on the belt loosening side the belt lifts considerably and blank paper feeding accuracy is reduced.

In the above pin tractor, as described in the specification of U.S. Pat. No. 4,214,691, for example, a frame is supported movably in relation to a guide shaft and a driving shaft which are arranged in parallel with each other and the position of the frame is adjusted according to the width of blank paper to be fed. A locking means is also provided for fixing the frame to the guide shaft at the desired position.

The above locking means comprises a tubular fixing member put on the guide shaft of the frame and a lever member rotatable on said fixing member. Also, the frame is formed of two members so that it can support a toothed pulley from both sides. Therefore, more parts are required, manufacturing cost is higher and assembly is more troublesome.

SUMMARY OF THE INVENTION

A main object of the present invention is to provide a pin tractor which will easily provide proper positioning of pins of the right and left belts carrying pins.

In order to attain the above object, the present invention is based on a pin tractor provided with a frame, a toothed driving pulley rotatably supported by said frame and a belt carrying pins which is wound around said toothed driving pulley, with pins which engage with feed perforations of blank paper at the surface of a belt base and teeth which engage with said toothed pulley for driving at the back surface of the belt base. The toothed driving pulley rotatably is supported by the frame only at one end portion thereof and the other end portion which is outwardly exposed has positioning marks by which synchronous position adjustment of the right and left belts carrying pins can be done easily.

Another object of the present invention is to provide a pin tractor which has a reduced blank paper feed load and has high feeding accuracy.

In order to realize the above object, the pin tractor according to the present invention comprises a frame proper, a toothed driving pulley and a driven plain pulley which are notatably supported by said frame and a belt carrying pins, with pins to engage with feed perforations of blank paper provided at the surface of a belt base wound around both pulleys and teeth to engage with said toothed pulley for driving provided at the back surface of the belt base. Said both pulleys are supported by the frame only at one end portion thereof and the other end portion thereof has a flange.

With the above arrangement, the belt carrying pins is caused to run straight by both flanges of the toothed driving pulley and the plain pulley and the frame proper. As both flanges turn with the belt carrying pins, the flanges do not resist running of the belt and therefore the blank paper feeding load is small.

A still another object of the present invention is to provide a pin tractor which is low in price because of the fewer number of parts required by providing a frame which consists of only one member and by simplifying the locking means.

In order to achieve the above object, the pin tractor according to the present invention comprises a frame movably supported by a guide shaft, a locking means for fixing said frame to said guide shaft, a toothed driving pulley and a driven pulley rotatably supported by said frame at one end portion thereof and a belt carrying pins, with pins to engage with feed perforations of blank paper provided at the surface of a belt base wound around both pulleys and teeth to engage with said toothed driving pulley provided at the back surface of the belt base. Said locking means comprises a fitting hole of a modified inside diameter provided at said frame and an operating member which is put through said fitting hole and has a tubular part which rotatably is deformable in a radial direction and which supports said driven pulley.

A further object of the present invention is to provide a pin tractor which is easy to with a presser member opening and close and requires less space for opening and closing and can save space.

In order to accomplish the above object, in the pin tractor having a frame on which a belt carrying pins is wound revolvably and a presser member which can be opened and closed is provided at said frame, blank paper with feed perforations at its both edges being supported between said frame and said presser member and being fed by engaging pins of the belt carrying pins with feed perforations of blank paper, said presser member has a shaft portion and said frame has a hole through a support portion through which the shaft portion is put and the presser member is slidably supported in relation to the frame by said shaft portion being positioned in the support hole.

The above and other objects and novel features of the present invention will be understood more clearly by reading the following detailed description with reference to the accompanying drawings.

BRIEF DESCRIPTION OF THE DRAWINGS

The accompanying drawings show a preferred embodiment of the present invention, in which

FIG. 12–FIG. 17 show another embodiments, in which FIG. 12–FIG. 14 are a front view, a plan view and an end view partly in section of the pin tractor respectively;

FIG. 15 is a plan view of the frame; and

FIG. 16 and FIG. 17 are a plan view and a front view of the presser member respectively.

DETAILED DESCRIPTION OF THE INVENTION

A preferred embodiment of the present invention is described below with reference to the accompanying drawings.

Figure 1:
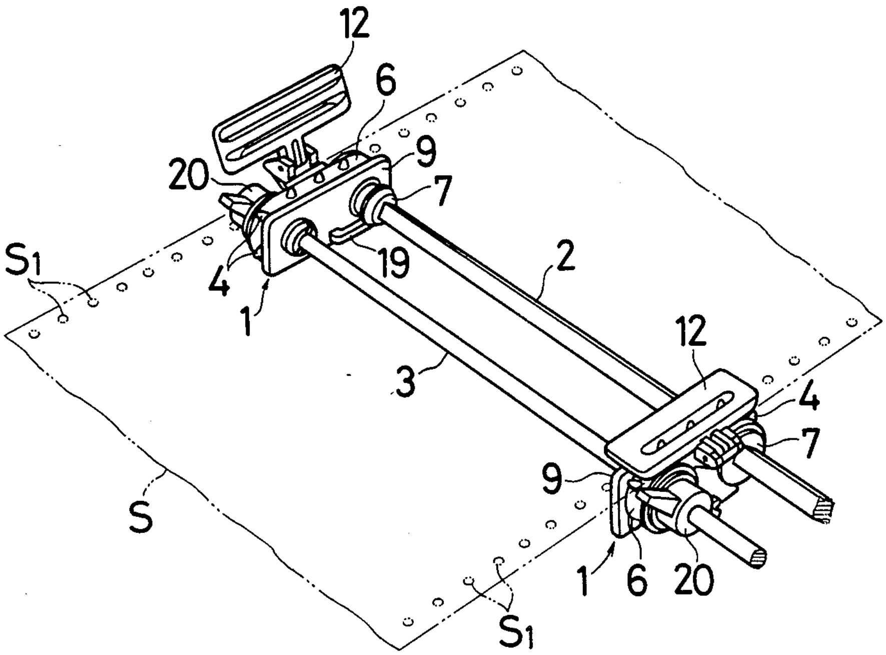
FIG. 1 is a perspective view of a blank paper feeding device using a pin tractor.

In the blank paper feeding device shown in FIG. 1, numeral 1 designates a pin tractor. Two pin tractors 1 are arranged with a space corresponding to the width of the blank paper S between them and are connected by a driving shaft 2, square in cross section, and a guide shaft 3, circular in cross section, which are substantially in parallel with each other.

Figure 2:
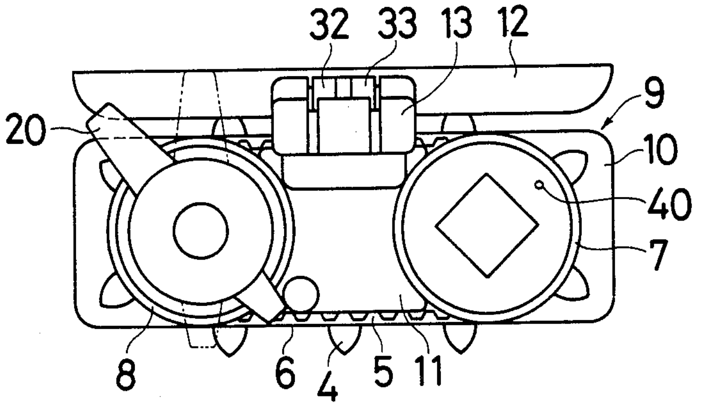
FIG. 2–FIG. 4 are a front view, a plan view and a side view, partly in section, of the pin tractor respectively.
Figure 3:
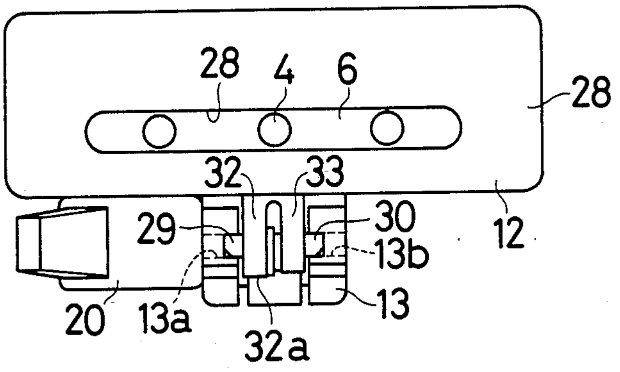
Figure 4:
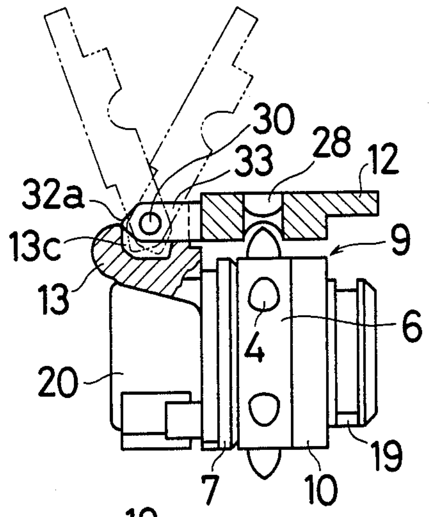

As shown in FIG. 2–FIG. 4, each pin tractor 1 has a belt 6 carrying or having a plurality of pins 4 engageable with feed perforations $S_1$ made at both edges of the blank paper S and projecting from the surface of the belt base at regular intervals. The belt 6 also has a plurality of teeth 5 at the back surface of the belt base. The blank paper S is driving and fed at a substantially uniform speed by the belt 6. The teeth 5 of the belt 6 engage with a toothed, driving pulley 7 mounted to the driving shaft 2 and a driven plain pulley 8 which are movable in an axial direction relative to the shafts 2 and 3. The toothed driving pulley 7 is fixed to rotate with the shaft 2 whereby the belt 6 carrying pins is driven to turn.

Figure 5:
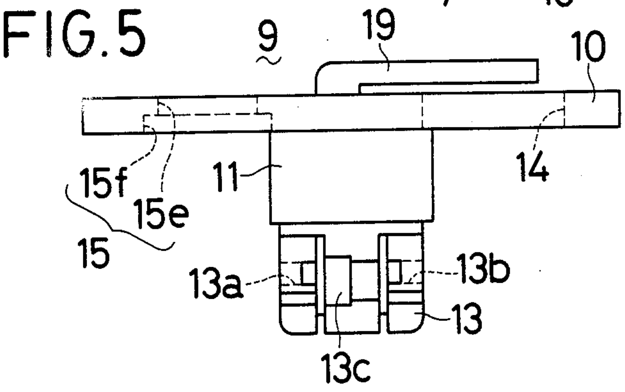
FIG. 5 is a plan view of the frame.
Figure 6:
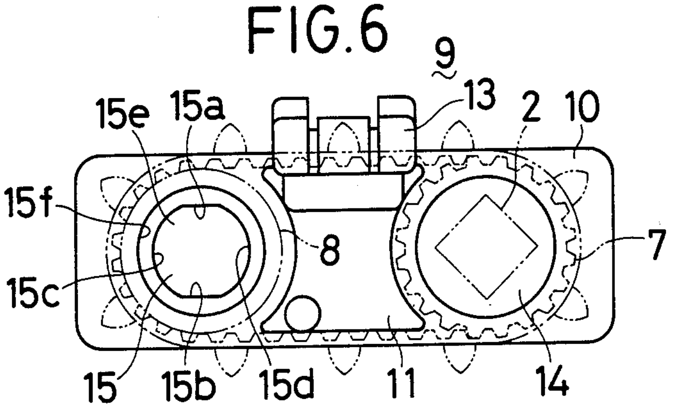
FIG. 6 is a front view of the frame.

A frame 9 of the pin tractor 1 is made of synthetic resin and as shown in FIG. 5 and FIG. 6, a protrusion 11 is formed at the central part of one side of a base plate part 10 which is substantially rectangular. A support part 13 which pivotally supports a presser member 12 made of synthetic resin is formed to project from the protrusion 11. Blank paper S which engages with the pins 4 of the belt 6 carrying pins is held between the frame 9 and the presser member 12.

Figure 7:
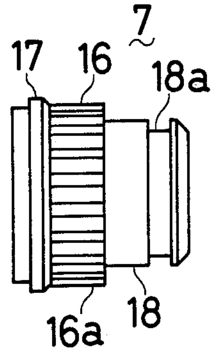
FIG. 7 and FIG. 8 are front views of the toothed driving pulley and the driven plain pulley respectively.

A pair of fitting holes 14 and 15 are provided at both sides of the protrusion 11 of the base plate part 10 and extend through the base plate part 10 The toothed driving pulley 7 which is fixed to and runs integrally with the driving shaft 2 is rotatably supported by the fitting hole 14. As shown in FIG. 7, the toothed driving pulley 7 comprises a pulley proper 16 having a tooth part 16*a*, a flange 17 provided at one side of the pulley proper 16 and a protrusion 18 having a circular groove 18*a*. An engaging part 19 formed at the opposite side of the base plate part 10 is positioned in the circular groove 18*a* of the protrusion 18 to permit rotation while preventing axial movement of the pulley 7 in relation to the base plate part 10. A mark 40 is provided at the exposed surface of the flage 17 for positioning of the belt 6 carrying pins (refer to FIG. 2).

The driven plain pulley 8 is rotatably supported in the fitting hole 15 through the medium of a locking member 20 which fixes the pin tractor 1 to the guide shaft 3. The fitting hole 15 is of such shape that its inside diameter varies in circumferential direction and is comprised of first hole 15*e* having opposed flat parts 15*a*, 15*b* and circular curved parts 15*c*, 15*d*. The second circular hole 15*f* is circular and continues in the axial direction of the first hole 15*e*.

Figure 8:
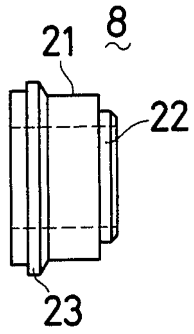
Figure 9:
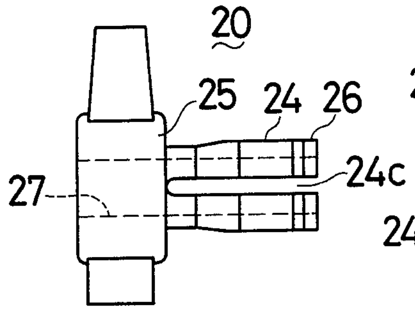
FIG. 9 and FIG. 10 are a front view and a side view, partly in section, of the locking member respectively.
Figure 10:
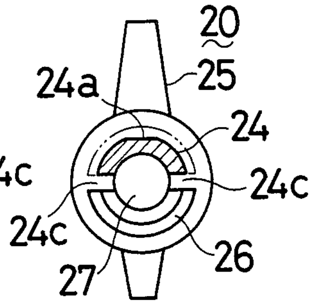

As shown in FIG. 8, the driven plain pulley 8 is provided with a protrusion 22 at one end of the pulley proper 21 which is put in the second part of 15*f* of fitting hole 15 and a flange 23 at the other end. The guide shaft 3 extends through a hole 27 provided through the lever part 25 and the flange part 26 of locking means 20. The tubular part 24 of locking means 20 has opposed flat surfaces 24*a*, 24*a*, which extend in a axial direction. Straight slits 24*c*, 24*c* are formed to extend through the tubular part 24 to the flange part 26 and are positioned about 90° shifted in circumferential direction from the flat parts 24*a*, 24*a*.

With the above arrangement, when the locking means 20 is rotated its flat surfaces 24*a*, 24*a* come off the flat parts 15*a*, 15*b* of the first hole 15*e* and the circumferential curved surface of the tubular part 24 is contacted by the flat parts 15*a*, 15*b*, whereby the tubular part 24 deforms in such a fashion that the inside diameter of the through hole 27 is reduced to frictionally engage fasten the tubular part 24 to the guide shaft 3. Thus, the pin tractor 1 is fixed immovably to the guide shaft 3.

Figure 11:
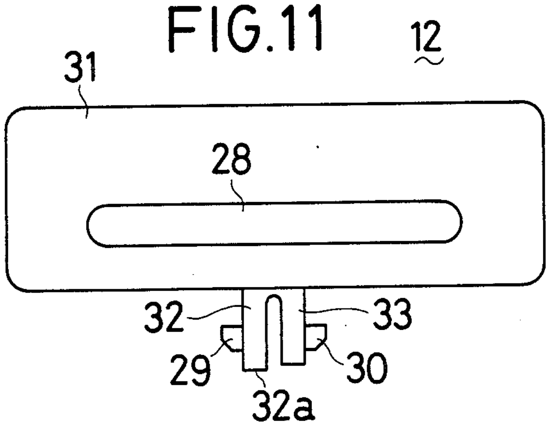
FIG. 11 is a plan view of the presser member.

As shown in FIG. 11, the presser member 12 has a slit 28 located at the position corresponding to a moving path of the pins 4 of the belt 6 carrying pins and axis parts 29, 30 to engage with the engaging holes 13*a*, 13*b* of the support part 13 of the frame 9. Axis parts 29, 30 project from arm parts 32, 33 respectively which protrude from a base plate part 31 in the same direction. The arm part 32 on one side is longer than the arm part 33 on the other side and a top part 32*a* (pawl part) of the former engages elastically with a concave 13*c* of the support part 13 to hole the presser member 12 at a predetermined open position. The axis part 29 and the axis part 30 project in opposite directions.

With the above arrangement, when the belt 6 carrying pins is engaged with the toothed driving pulley 7 it is possible to effect engagement while watching for the positioning mark 40 on the flange 17 of the toothed pulley 7. The position of the pins 4 of the belt 6 relative to the driving shaft 2 can be set easily. Accordingly, positioning of pins 4 of the belts 6 carrying pins located at both edges of the blank paper S can be carried out easily to provide for synchronous running of the pins 4 of both belts 6.

In the above embodiment, the belt 6 carrying pins is wound round between the toothed driving pulley 7 and the driven plain pulley 8 but the provision of the mark for positioning at the flange of the toothed driving pulley is also applicable to the case where the belt carrying pins is wound round between a toothed driving pulley and a guide part formed on the frame.

When the belt carrying pins runs by the revolution of the toothed driving pulley 7 for driving, the belt 6 carrying pins is not controlled by a guide groove of the frame proper or other parts as in the case of the conventional pin tractor. Therefore, the frictional resistance is small and the blank paper feeding load is reduced. Although the movement of the belt 6 carrying pins in the direction of the belt width is controlled by flanges 17, 23 of both pulleys 7, 8, flanges 17, 23 which are in contact with the belt 6 carrying pins turn with the belt 6 carrying pins and therefore no frictional resistance is generated.

In assembling the pin tractor according to the present invention, the belt 6 carrying pins is provided on one side of the frame then the toothed driving pulley 7 and the driven plain pulley are installed and the locking member 20 is applied to the driven plain pulley 8. Thus, assembling efficiency is very high.

In the above embodiment, the presser member 12 is pivotally supported in relation to the frame 9, but as shown in FIG. 12–FIG. 17, the presser member can be supported in such a fashion that it is slidable in a vertical direction relative to the frame.

Figure 12:
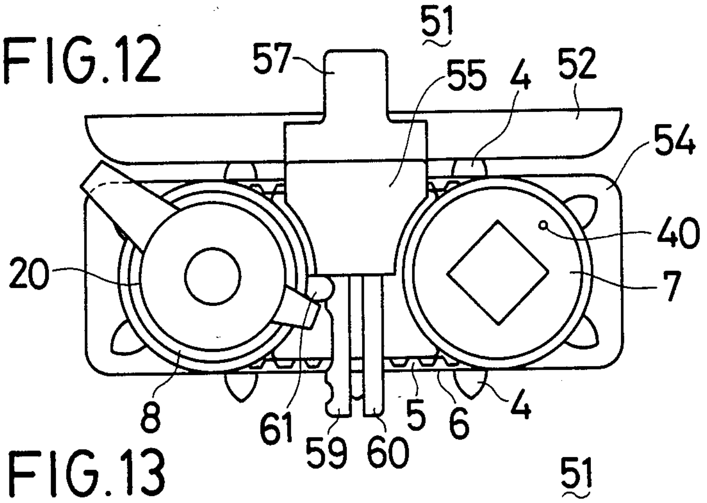
Figure 13:
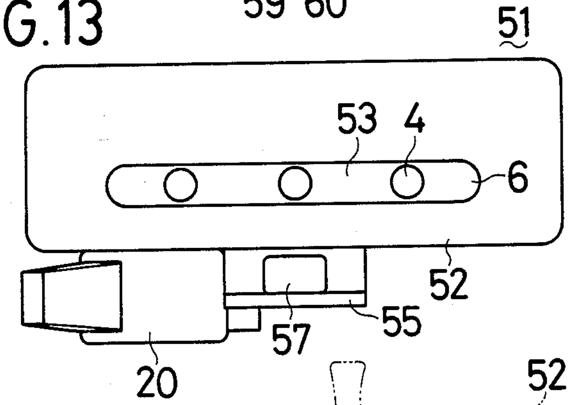
Figure 14:
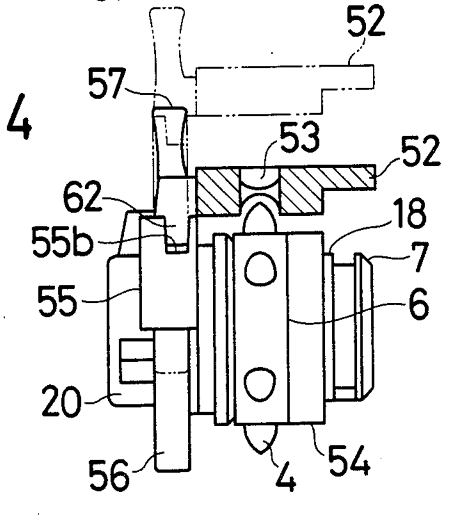
Figure 15:
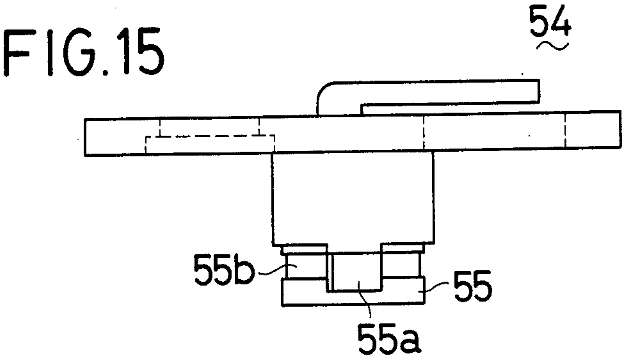
Figure 16:
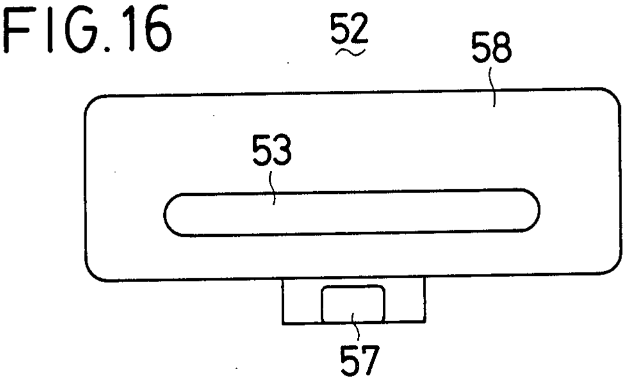
Figure 17:
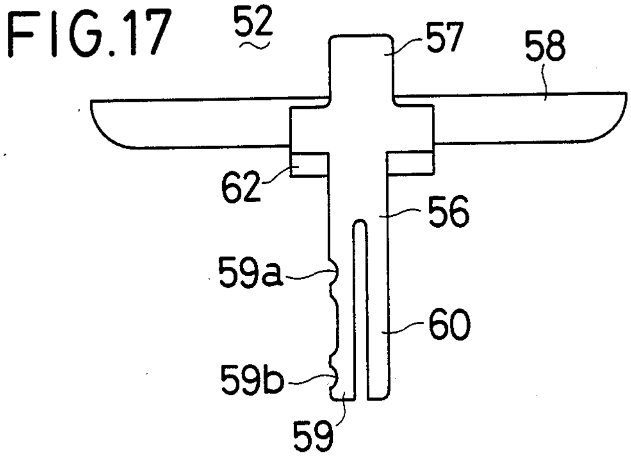

As shown by FIG. 12–FIG. 14, a presser member 52 of a pin tractor 51 has a slit 53 located at the position corresponding to the moving path of the pins 4 of the belt 6. The presser member also has on one side thereof an axially elongated shaft 56 which engages with a support hole 55*a* of a support 55. A knob 57 on the shaft 56 extend to the other side of presser member 12. The shaft 56 projects from a base plate part 58 in a direction perpendicular to the base plate part 58 and is bifurcated into a pair of arm parts 59, 60. The arm part 59 has a first concaved part 59*a* and a second concaved part 59*b* spaced apart in the vertical direction. The first concaved part 59*a* engages elastically with an engaging pin 61 at the lower end of the support part 55 for keeping the presser member 52 in a closed position and the second concaved part 59*b* engages elastically with the engaging pin 61 for keeping the presser member 52 in an opened position. A groove 55*b* is formed at the upper surface of the support part 55. When the presser member 52 is in closed position, an engaging part 62 formed on the pressure member engages with the groove 55*b*.

With the above arrangement, by pinching and lifting the knob 57 of the presser member 52 up, the shaft 56 slides upwardly, being guided by the support hole 55*a* of the support part 55, whereupon the engaging pin 61 engages elastically with the second concaved part 59*b* of the arm part 59 and the presser member 52 is held elastically in an opened position.

By depressing the presser member 52, the shaft 56 slides downwardly along the support hole 55*a* of the support part 55, whereupon the engaging pin 61 engages elastically with the first concaved part 59*a* and the engaging part 62 engages with the groove 55*b*. Thus, the presser member 52 is held in a closed position.

As stated above, opening and closing movement of the presser member 52 can be accomplished by sliding the presser member 52 in a vertical direction in relation to the frame 54. Therefore, only a small space is required for opening and closing the presser member thereby saving space and and providing a compact pin tractor assembly, with simplification of the connecting mechanism of the presser member 52 and the frame 54.

In the above embodiment, the presser member can be put through the frame only from above, but it is also possible to put it through from either above or from below as is desired by forming the support part vertically symmetrical. Also, in the above embodiment the belt 6 carrying pins is wound around between the toothed driving pulley 7 and the driven plain pulley 8 but this embodiment is also applicable to the case where the belt carrying pins is wound around between a toothed driving pulley and a guide formed on the frame.

As the present invention can be embodied in various forms without departing from its basic characteristics, the above embodiments have been given solely for explanation purposes and are not of a restrictive nature. Furthermore, as the scope of the present invention is not limited by the preceding description but limited only by the scope of claims appended hereto, any design changes in the requirements of the scope of claim for patent and equivalents to such foregoing embodiments which fall within the requirements are included in the claims for patent.

What is claimed is:

1. A pin tractor for feeding blank paper with feed perforations at both edges thereof comprising:
- a frame having a single base plate,
- a driving pulley having a toothed body portion and a side surface at one side of said body portion,
- means rotatably mounting one end of said driving pulley opposite from said side surface to said base plate,
- a belt having a plurality of pins on one surface thereof adapted to engage said feed perforations of said blank paper and teeth on another surface of said belt for engaging said toothed body portion of said driving pulley, said belt being supported on said frame and wound around said driving pulley for driving engagement therewith, and
- a positioning mark on said side surface of said driving pulley,
- whereby said driving pulley will be rotatably supported at only one end by said base plate and said positioning mark will be exposed for positioning said driving pulley and belt in relation to said frame.

2. A pin tractor as defined in claim 1, wherein said driving pulley has a flange on said one side of said toothed body portion and said positioning mark is on an exposed surface of said flange.

3. A pin tractor as defined in claim 2, wherein said means mounting said driving pulley includes a protrusion on one end of the driving pulley and said protrusion is rotatably supported in an aperture through said base plate.

4. A pin tractor as defined in claim 1 wherein said pin tractor further includes a presser member and said frame includes a support part, said presser member has a shaft and the support part of the frame has a support hole for receiving said shaft, whereby the presser member may be slidably supported in said support hole and movable relative to the frame to open and close the presser member.

5. A pin tractor for feeding blank paper with feed perforations at both edges thereof comprising:

a frame having a base plate with an aperture open from one side to the other side of said plate and an engaging part of said other side of said base plate, a driving pulley having a toothed body portion, a flange at one side of said body portion and a protrusion having a circumferential groove at the other side of said body portion, said driving pulley being rotatably supported by said protrusion extending through said aperture with said engaging part engaging said circumferential groove, a belt having a plurality of pins on one surface thereof adapted to engage said feed perforations of said blank paper and teeth on another surface thereof for engaging said toothed body portion of said driving pulley, said belt being supported on said frame and wound around said driving pulley for driving engagement therewith, and a positioning mark on a surface of said flange opposite from said toothed body portion of said driving pulley, whereby said driving pulley will be rotatably supported at only one end portion by said protrusion and said positioning mark will be exposed for positioning said driving pulley and belt in relation to said frame.

6. A pin tractor for feeding blank paper with feed perforations at both edges thereof comprising:

a frame having a single base plate, a driving pulley having a toothed body portion and a flange at one side of said body portion, a driven pulley having a flange at one side thereof, means rotatably mounting one end of each of said driving pulley and said driven pulley to said base plate with said flanges spaced from said base plate, a belt having a plurality of pins on one surface thereof adapted to engage said feed perforations of said blank paper and teeth on another surface of said belt for engaging said toothed body portion of said driving pulley, said belt being wound for rotation around said driving pulley and said driven pulley with the edges of said belt disposed adjacent said base plate and said flanges, whereby said driving pulley and said driven pulley are both rotatably supported at only one end by said base plate and said flanges rotate with and guide one edge of said belt as said belt rotates around said pulleys.

7. A pin tractor as defined in claim 6, wherein said means rotatably mounting said driving pulley includes a protrusion on the other side of said toothed body portion and said protrusion is rotatably supported in an aperture through said base plate.

8. A pin tractor as defined in claim 6, wherein said means rotatably mounting said driven pulley includes a protrusion rotatably supported in a fitting hole of said base plate and said protrusion is provided at one end of the driven pulley opposite from said flange.

9. A pin tractor as defined in claim 6, wherein said pin tractor further includes a presser member and said frame includes a support part, said presser member has a shaft and the support part of the frame has a support hole for receiving said shaft, whereby the presser member is slidably supported in said support hole and movable relative to the frame to open and close the presser member.

10. A pin tractor for feeding blank paper with feed perforations at both edges thereof comprising:

a frame movably supported by a guide axis and having a stepped cylindrical fitting hole having one diameter in one direction and a narrower width in a second direction, a driving pulley having a toothed body portion, a driven pulley, means rotatably mounting one end of each of said driving pulley and said driven pulley to said frame, a belt having a plurality of pins on one surface thereof adapted to engage said feed perforations of said blank paper and teeth on another surface of said belt for engaging said toothed body portion of said driving pulley, said belt being wound around said driving pulley and said driven pulley with said teeth engaging said toothed body portion of said driving pulley, and locking means for fixing said frame to said guide axis, said locking means including an operating member having a tubular part insertable into said fitting hole and radially deformable when rotated internally of said fitting hole to frictionally engage said guide axis, and said driven pulley being rotatably supported by said tubular part of said operating member.

11. A pin tractor as defined in claim 10, wherein the shape of said fitting hole comprises two diametrically opposed flat parts and circularly curved parts connecting said flat parts.

12. A pin tractor as defined in claim 11, wherein said operating member further includes straight slits through said tubular part and said slits are positioned about 90° in a circumferential direction from flat surfaces provided on said tubular part.

13. A pin tractor as defined in claim 10, wherein the operating member has a lever part at one end of the tubular part and a flange for stopping slip at the other end and said guide axis is received in a through hole extending through said lever part and said flange.

14. A pin tractor as defined in claim 10, wherein said pin tractor further includes a presser member and said frame includes a support part, said presser member has a shaft and the support part of the frame has a support hole for receiving said shaft, whereby the presser member is slidably supported in said support hole and movable relative to the frame to open and close the presser member.

15. A pin tractor of the type including a frame having a support part, a belt having a plurality of pins on one surface thereof, means mounting said belt for movement around members supported by said frame, and a presser member carried by said frame and movable between an open position and a closed position for holding an edge portion of blank paper having feed perforations engaged by said pins between said belt and said pressing member, wherein the improvement comprises:

a presser member having a shaft, and a support hole through said support part of said frame for slidably receiving said shaft whereby said shaft is supported for sliding movement in said support hole between an open and a closed operating position.

16. A pin tractor as defined in claim 15, wherein a groove is formed at the upper surface of the support part of the frame and an engaging part formed on said presser member and projecting from the same side of said presser member as said shaft and engaging said groove, when said shaft is in said closed position.

17. A pin tractor of the type including a frame having a support part, a belt having a plurality of pins on one surface thereof, means mounting said belt for movement around members supported by said frame, and a presser member carried by said frame and movable between an open position and a closed position for holding an edge portion of blank paper having feed perforations engaged by said pins between said belt and said pressing member, wherein the improvement comprises:

a presser member having a shaft bifurcated into a pair of arm parts, one of said arm parts having a concave part, a support hole through said support part of said frame for slidably receiving said shaft and an engaging pin mounted to said support part of said frame whereby said shaft is supported for sliding movement in said support hole between an open and a closed operating position with said engaging pin engaging said concave part when said presser member is in said closed position.

18. A pin tractor as defined in claim 17, wherein said concave part has a first concave engaged by said engaging pin to hold the presser member in said closed position and a second concave engaged by said engaging pin to hold the presser member in an open position.

* * * * *